United States Patent
Lovitt et al.

(10) Patent No.: US 12,238,059 B2
(45) Date of Patent: Feb. 25, 2025

(54) GENERATING A SUMMARY OF A CONVERSATION BETWEEN USERS FOR AN ADDITIONAL USER IN RESPONSE TO DETERMINING THE ADDITIONAL USER IS JOINING THE CONVERSATION

(71) Applicant: META PLATFORMS TECHNOLOGIES, LLC, Menlo Park, CA (US)

(72) Inventors: Andrew Lovitt, Redmond, WA (US); Scott Phillip Selfon, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 68 days.

(21) Appl. No.: 17/540,179

(22) Filed: Dec. 1, 2021

(65) Prior Publication Data

US 2024/0297863 A1    Sep. 5, 2024

(51) Int. Cl.
*H04L 51/216* (2022.01)
*H04L 51/10* (2022.01)
*H04L 51/222* (2022.01)

(52) U.S. Cl.
CPC ............ *H04L 51/216* (2022.05); *H04L 51/10* (2013.01); *H04L 51/222* (2022.05)

(58) Field of Classification Search
CPC ...... H04L 51/216; H04L 51/10; H04L 51/222
See application file for complete search history.

(56) References Cited

U.S. PATENT DOCUMENTS 8,266,536 B2    9/2012   Roberts et al.
8,615,383 B2    12/2013  Dobbins et al.
(Continued)

FOREIGN PATENT DOCUMENTS

NO    343601 B1    4/2019
WO    2019059944 A1    3/2019
(Continued)

OTHER PUBLICATIONS

"Asynchronous Message-Based Communication," Microsoft, 2021, 7 pages, Retrieved from the Internet: URL: https://docs.microsoft.com/en-us/dotnet/architecture/microservices/architect-microservice-container-applications/asynchronous-message-based-communication.

Kendall M., "Take Back Your Work Day with Asynchronous Communication," Vimeo Blog, 2021, 13 pages, Retrieved from the Internet: URL: https://vimeo.com/blog/post/how-asynchronous-communications-improve-efficiency/.

(Continued)

*Primary Examiner* — Nicholas R Taylor
*Assistant Examiner* — Tania M Pena-Santana
(74) *Attorney, Agent, or Firm* — Potomac Law Group, PLLC; Dannon G. Allbee

(57) ABSTRACT

A communication system actively monitors a conversation between users in an environment. Once a threshold condition occurs (e.g., client device within a threshold distance of a room where the conversation is occurring, the user enters a chatroom via the client device), the client device receives a summary from the communication system. The communication system may customize the summary in accordance with user preferences. User preferences may include level of detail in summary or time range associated with summary. The client device then presents the summary to the user. The summary may be audio or text. In some embodiments, the summary may be historical audio that is overlaid over current audio at faster speed and higher volume, and stops once the historical audio reaches real time.

26 Claims, 5 Drawing Sheets

(56) References Cited

U.S. PATENT DOCUMENTS

| | | |
|---|---|---|
| 8,806,354 B1 | 8/2014 | Hyndman et al. |
| 8,949,159 B2 | 2/2015 | Krishnakumar et al. |
| 8,949,352 B2 | 2/2015 | Lewis et al. |
| 9,038,127 B2 | 5/2015 | Hastings et al. |
| 9,616,338 B1 | 4/2017 | Hooper et al. |
| 9,635,091 B1 | 4/2017 | Laukkanen et al. |
| 9,836,595 B1 | 12/2017 | Goldberg et al. |
| 10,015,212 B2 | 7/2018 | Sylvain |
| 10,320,857 B2 | 6/2019 | Nichols et al. |
| 10,347,040 B2 | 7/2019 | Boulkenafed et al. |
| 11,095,468 B1 | 8/2021 | Pandey et al. |
| 11,157,739 B1 | 10/2021 | Iskandar et al. |
| 11,302,085 B2 | 4/2022 | Lebeau et al. |
| 11,315,569 B1 | 4/2022 | Talieh et al. |
| 11,456,887 B1 | 9/2022 | McCracken et al. |
| 11,582,245 B2 | 2/2023 | Lebeau et al. |
| 11,606,364 B2 | 3/2023 | Lebeau et al. |
| 11,770,384 B2 | 9/2023 | Lebeau et al. |
| 11,886,625 B1 | 1/2024 | Trzynadlowski et al. |
| 11,902,288 B2 | 2/2024 | Lebeau et al. |
| 2003/0005177 A1 | 1/2003 | Duran et al. |
| 2008/0059570 A1 | 3/2008 | Bill |
| 2009/0113066 A1 | 4/2009 | Van Wie et al. |
| 2009/0119604 A1 | 5/2009 | Simard et al. |
| 2010/0011072 A1* | 1/2010 | Mishchenko ......... G06Q 10/10 709/206 |
| 2010/0214226 A1 | 8/2010 | Brown et al. |
| 2010/0318399 A1 | 12/2010 | Li et al. |
| 2011/0113351 A1 | 5/2011 | Phillips |
| 2012/0192088 A1 | 7/2012 | Sauriol et al. |
| 2012/0249741 A1 | 10/2012 | Maciocci et al. |
| 2012/0284640 A1* | 11/2012 | Sloyer .................... G06Q 10/10 715/753 |
| 2012/0302076 A1 | 11/2012 | Tsai |
| 2013/0335405 A1 | 12/2013 | Scavezze et al. |
| 2014/0072143 A1 | 3/2014 | Liu et al. |
| 2015/0332732 A1* | 11/2015 | Gilson ................. G11B 27/005 386/240 |
| 2016/0210602 A1 | 7/2016 | Siddique et al. |
| 2016/0313790 A1 | 10/2016 | Clement et al. |
| 2016/0314624 A1 | 10/2016 | Li et al. |
| 2017/0132518 A1* | 5/2017 | Kitada ................... H04N 7/147 |
| 2017/0262045 A1 | 9/2017 | Rouvinez et al. |
| 2017/0269713 A1 | 9/2017 | Marks et al. |
| 2017/0270930 A1 | 9/2017 | Ozmeral et al. |
| 2018/0004305 A1 | 1/2018 | Moseley et al. |
| 2018/0077099 A1* | 3/2018 | Silva ....................... H04L 51/04 |
| 2018/0284982 A1 | 10/2018 | Veeramani et al. |
| 2018/0307303 A1 | 10/2018 | Powderly et al. |
| 2018/0336915 A1 | 11/2018 | Jalali et al. |
| 2018/0350150 A1 | 12/2018 | Powderly et al. |
| 2019/0273767 A1 | 9/2019 | Nelson et al. |
| 2019/0297039 A1* | 9/2019 | Rodriguez .............. H04L 51/02 |
| 2019/0327392 A1 | 10/2019 | Sarkar |
| 2019/0341050 A1 | 11/2019 | Diamant et al. |
| 2019/0378076 A1* | 12/2019 | O'Gorman .............. H04M 3/56 |
| 2019/0394444 A1 | 12/2019 | Oh et al. |
| 2020/0151065 A1 | 5/2020 | Rinaldi et al. |
| 2020/0175766 A1 | 6/2020 | Gawrys et al. |
| 2020/0210127 A1 | 7/2020 | Browy |
| 2020/0210137 A1 | 7/2020 | Noris et al. |
| 2020/0218350 A1 | 7/2020 | Coleman et al. |
| 2020/0233681 A1 | 7/2020 | Garstenauer et al. |
| 2021/0021439 A1 | 1/2021 | Gorny et al. |
| 2021/0065455 A1 | 3/2021 | Beith et al. |
| 2021/0072947 A1 | 3/2021 | Anderson et al. |
| 2021/0096726 A1 | 4/2021 | Faulkner et al. |
| 2021/0144220 A1 | 5/2021 | Zavesky et al. |
| 2021/0255696 A1 | 8/2021 | Shuster et al. |
| 2021/0336784 A1 | 10/2021 | Athlur et al. |
| 2021/0349676 A1 | 11/2021 | Sommer et al. |
| 2021/0409547 A1* | 12/2021 | Channapragada .. H04L 12/1822 |
| 2022/0053218 A1 | 2/2022 | Malecki |
| 2022/0066620 A1 | 3/2022 | Anderson et al. |
| 2022/0115020 A1 | 4/2022 | Bradley et al. |
| 2022/0124125 A1 | 4/2022 | Punwani et al. |
| 2022/0214743 A1 | 7/2022 | Dascola et al. |
| 2022/0221966 A1 | 7/2022 | Zionpour et al. |
| 2022/0253136 A1 | 8/2022 | Holder et al. |
| 2022/0253605 A1 | 8/2022 | Tan et al. |
| 2023/0164211 A1 | 5/2023 | Laukkanen et al. |
| 2023/0267922 A1 | 8/2023 | Siohan et al. |
| 2023/0376515 A1 | 11/2023 | Tanikella |
| 2024/0005085 A1 | 1/2024 | Kukde et al. |
| 2024/0005612 A1 | 1/2024 | Yokokawa et al. |
| 2024/0013158 A1 | 1/2024 | Zahavi et al. |
| 2024/0015371 A1 | 1/2024 | Biswas et al. |
| 2024/0112412 A1 | 4/2024 | Wanbo et al. |
| 2024/0112413 A1 | 4/2024 | Wanbo et al. |
| 2024/0112414 A1 | 4/2024 | Wanbo et al. |
| 2024/0211093 A1 | 6/2024 | Hughes et al. |
| 2024/0212290 A1 | 6/2024 | Hughes et al. |
| 2024/0250955 A1 | 7/2024 | Lebeau et al. |
| 2024/0320893 A1 | 9/2024 | Barnes et al. |
| 2024/0320938 A1 | 9/2024 | Lebeau et al. |

FOREIGN PATENT DOCUMENTS

| | | |
|---|---|---|
| WO | 2020005604 A1 | 1/2020 |
| WO | 2021101695 A1 | 5/2021 |

OTHER PUBLICATIONS

"Synchronous vs. Asynchronous Communication: How to Use Both to Dominate Remote Work," TechSmith, [Retrieved on Jan. 5, 2022], 24 pages, Retrieved from the Internet : URL: https://www.techsmith.com/blog/synchronous-vs-asynchronous-communication/.

International Preliminary Report on Patentability for International Application No. PCT/US2021/050427, mailed Mar. 30, 2023, 15 pages.

International Search Report and Written Opinion for International Application No. PCT/US2021/050427, mailed Feb. 25, 2022, 19 pages.

Invitation to Pay Additional Fees for International Application No. PCT/US2021/050427, Jan. 4, 2022, 14 pages.

Pakanen M., et al., "Nice To See You Virtually: Thoughtful Design and Evaluation of Virtual Avatar of the Other User in AR And VR Based Telexistence Systems," Entertainment Computing, Jan. 1, 2022, vol. 40, 16 pages.

* cited by examiner

GENERATING A SUMMARY OF A CONVERSATION BETWEEN USERS FOR AN ADDITIONAL USER IN RESPONSE TO DETERMINING THE ADDITIONAL USER IS JOINING THE CONVERSATION

FIELD OF THE INVENTION

This disclosure relates generally to artificial reality systems, and more specifically to generating a summary of messages included in a conversation between users of an artificial reality system for display to another user joining the conversation.

BACKGROUND

Users of various online systems, such as artificial reality systems exchange messages with other users, forming conversations between users. The messages exchanged between users in a conversation may be synchronously exchanged. For example, a conversation includes chat messages exchanged between users or includes audio data synchronously shared between different users. When an additional user seeks to join an existing conversation between users, the additional user lacks context of the messages that have been exchanged in the conversation before the additional user joined the conversation. It may be time-intensive for the additional user to review the previously exchanged messages to determine subject matter addressed by the conversation, making it difficult for the additional user to readily participate in the conversation. Further, while the additional user may determine the subject matter addressed by previously exchanged messages in the conversation, the additional user is unable to determine contexts in which the prior messages were exchanged, limiting information about how users already in the conversation have interacted with each other available to the additional user.

SUMMARY

A communication system receives messages from users participating in a conversation. The messages may be received from client devices of the users and displayed or presented via client devices or the user. Alternatively or additionally, the communication system is coupled to one or more sensors, such as microphones or image capture devices, in an environment which capture the messages spoken or performed by users in the environment. When characteristics of a client device of an additional user satisfy one or more conditions for joining the conversation, the communication system generates a summary of the conversation for the additional user. Example conditions for the client device of the additional user joining the conversation include a location of the client device of the additional user being within a threshold distance of a location where the conversation is occurring or the communication system receiving a request to join the conversation from the client device of the additional user. Example requests to join the conversation include the additional user selecting a specific interface element displayed by the client device of the additional user, the additional client device receiving a specific audio command (e.g., a microphone or an audio capture device of the additional client device capturing a phrase, such as "join conversation" from the additional user), one or more sensors of the additional client device capturing a specific gesture by the additional user, or any other suitable input from the additional user. The summary generated for the additional user may be customized for the additional user based on preferences maintained by the communication system for the additional user, allowing the additional user to specify a level of detail of the summary or a range of time prior to the additional user joining the conversation that is described in the summary. The client device of the user then presents the summary, which may include audio data or text data, to the additional user.

Figure 1A:
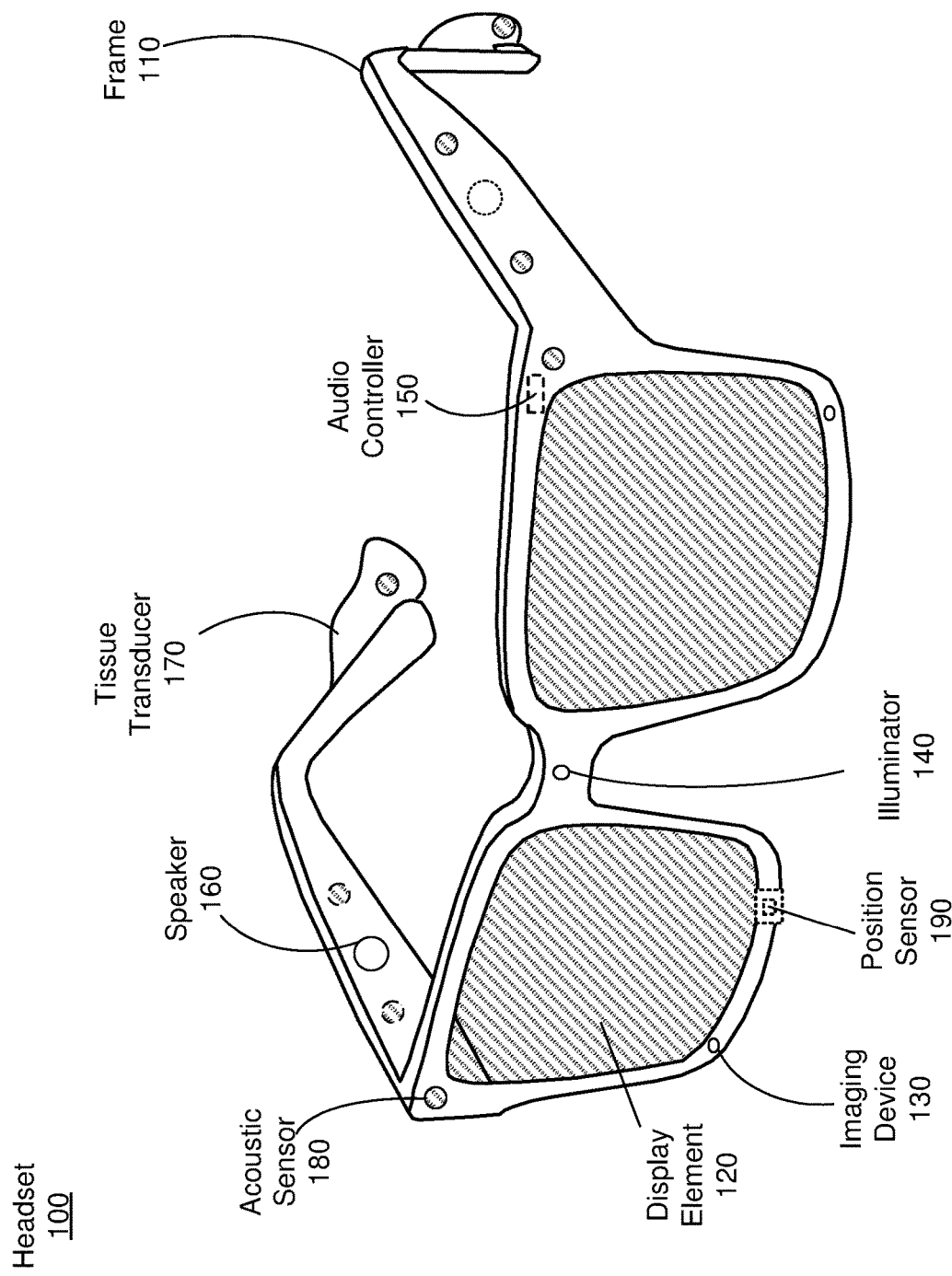
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Users exchange messages with each other through a communication system. In various embodiments, the communication system is an online system configured to receive data from a user and to transmit the received data to one or more other users participating in a conversation. For example, the communication system receives audio data, video data, image data, text data, or any combination thereof from a user and transmits the received data to one or more other users, such as users identified by the user.

As the conversation between users occurs, an additional user may join in the conversation, so the additional user joins the conversation after messages have been exchanged between the plurality of users already participating in the conversation. In various embodiments, the conversation. While this allows the additional user to exchange messages with the other users already participating in the conversation, the additional user is unaware of subjects that have previously been addressed by messages exchanged between users already participating in the conversation and of reactions by users already participating in the conversation to earlier messages in the conversation. To allow the additional user to more easily join and participate in the conversation, when the communication system determines a client device of the additional user satisfies one or more conditions for joining the conversation, the communication system generates a summary of the conversation that is transmitted to the client device for presentation to the additional user. The summary may be audio data or text data that describes topics or subjects addressed by messages exchanged in the conversation before the additional user joined the conversation. Further, the summary may include information describing emotions or moods of users participating in the conversation, allowing the additional user to obtain more complete information about the conversation when joining the conversation. This allows the additional user to more quickly contribute to and participate in the conversation with awareness of what has occurred in the conversation before the additional user joined the conversation.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
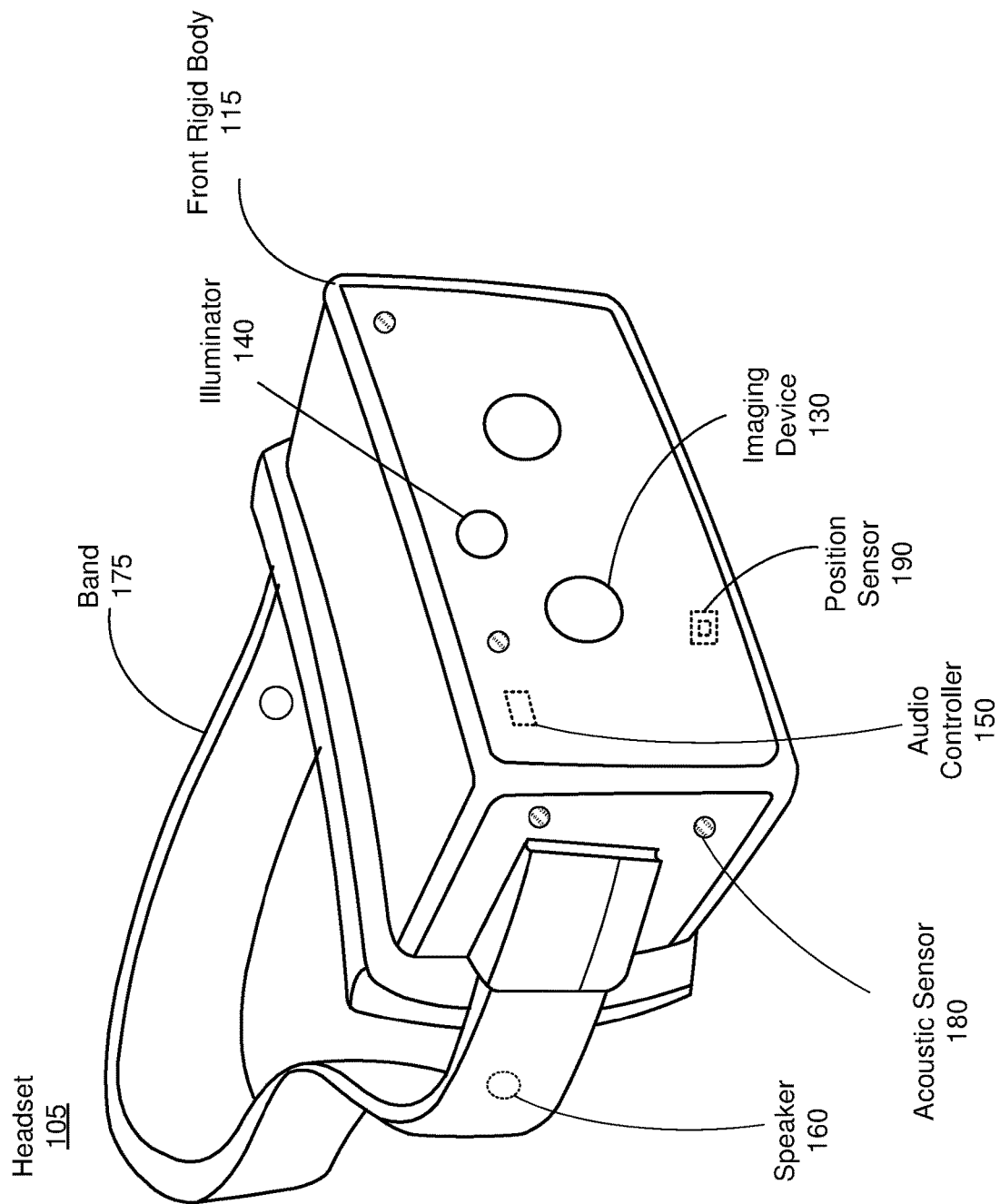
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Using headset 100 or headset 105, users may exchange messages with each other. The messages may comprise audio data, video data, text data, or any combination thereof. Users exchanging messages with each other are identified herein as participating in a conversation. Text or video data in a message is displayed to a user via the display element 120, while audio data in a message is played to a user via one or more speakers 160. One or more acoustic sensors 180 capture audio data for communication to other users via a message, while imaging device 130 captures image data or video data for inclusion in a message communicated to one or more other users. In various embodiments, one or more headsets 100, 105 are communicatively coupled to a communication system, as further described below in conjunction with FIG. 3. The communication system receives a message from a headset 100, 105 and transmits the message to one or more other headsets 100, 105 of users participating in a conversation.

Figure 2:
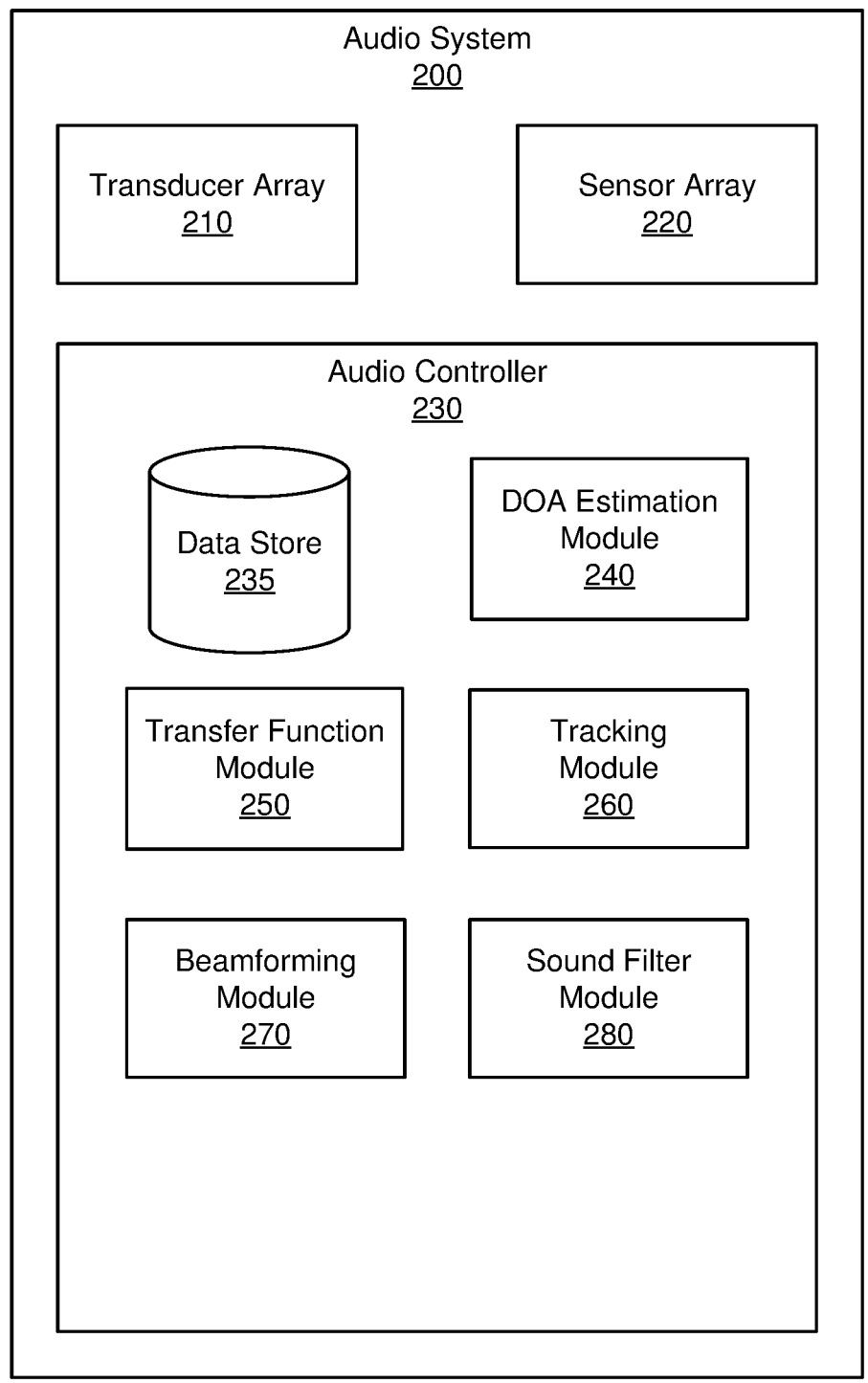
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 4).

The sound filter module 280 provides the sound filters to the transducer array 210. In some embodiments, the sound filters may cause positive or negative amplification of sounds as a function of frequency.

Figure 3:
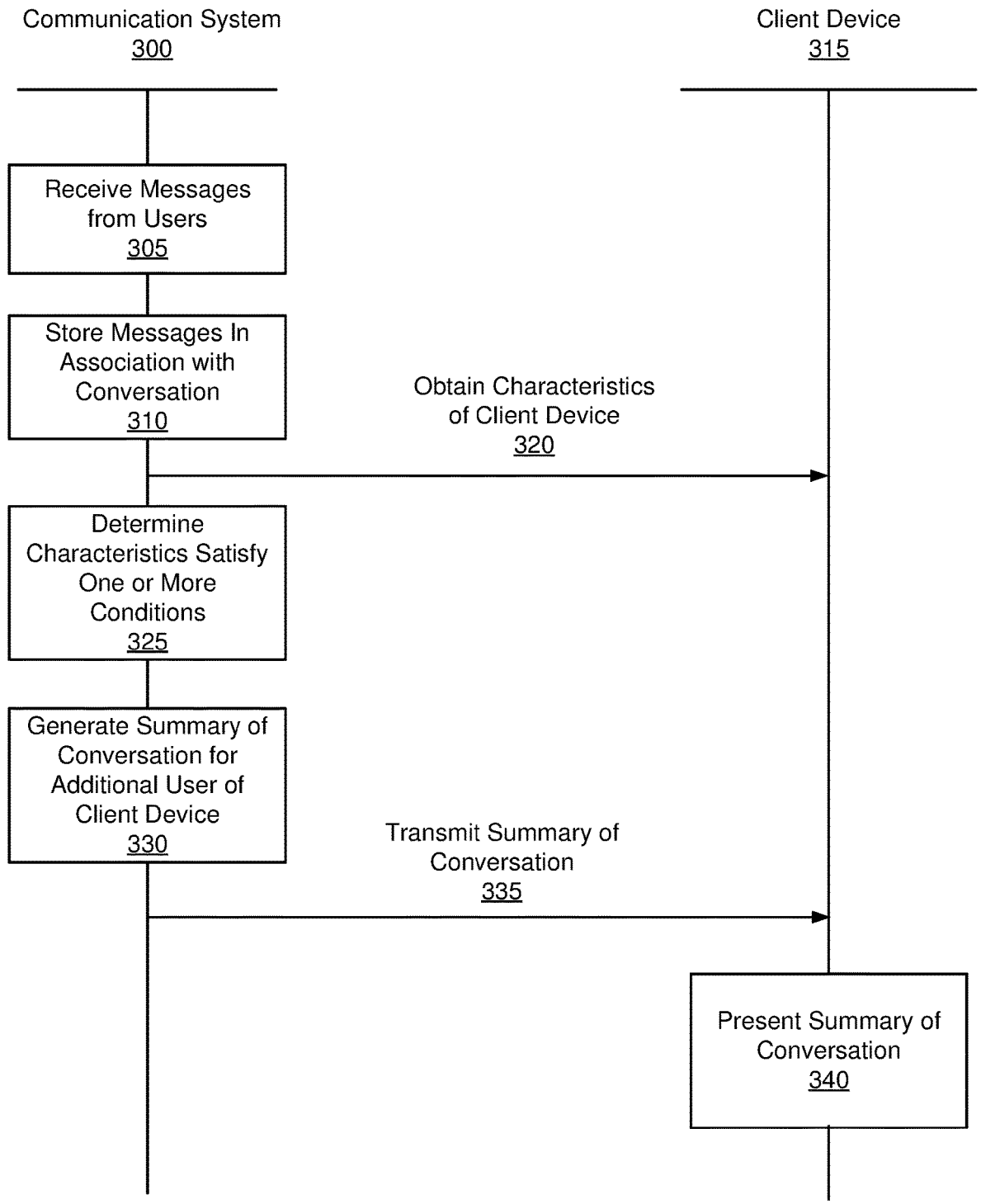
FIG. 3 is an interaction diagram of a method for generating a summary of a conversation between users of a communication for an additional user joining the conversation, in accordance with one or more embodiments.

FIG. 3 is an interaction diagram of a method for generating a summary of a conversation between users of a communication for an additional user joining the conversation, in accordance with one or more embodiments. The process shown in FIG. 3 may be performed by components of a communication system and a client device, such as a headset or a head mounted display as further described in conjunction with FIGS. 1A and 1B. Other entities may perform some or all of the steps in FIG. 3 in other embodiments. Embodiments may include different and/or additional steps, or perform the steps in different orders.

Users exchange messages with each other through a communication system 300. In various embodiments, the communication system 300 is an online system configured to receive data from a user and to transmit the received data to one or more other users participating in a conversation. For example, the communication system 300 receives audio data, video data, image data, text data, or any combination thereof from a user and transmits the received data to one or more other users, such as users identified by the user. In some embodiments, data received by the communication system 300 includes an avatar or other visual depiction of one or more users. In various embodiments, the communication system 300 includes one or more microphones or is coupled to one or more microphones, configured to capture audio data from users. Additionally or alternatively, the communication system 300 includes one or more image capture devices, such as cameras, configured to capture images or videos of users. The communication system 300 may receive data from a client device of a user and transmit the data to a client device of another user. For example, the communication system 300 receives a text message or a chat message from a client device of a user and transmits the text message or chat message to a client device of another user identified by the user.

The communication system 300 allows a plurality of users to establish a conversation with each other, with the communication system 300 directing data between different users participating in the conversation. For purposes of illustration, data exchanged between users in a conversation is identified herein as a "message" from a user. A message may include text data, video data, image data, audio data, or any combination thereof. In various embodiments, the communication system 300 receives a message from a headset or other client device of a user. Alternatively, the communication system 300 receives a message from a user based on audio data, video data, or image data captured by the communication system 300 that includes the user. For example, the communication system 300 is coupled to one or more image capture devices or microphones in an environment, such as a room, and the communication system 300 identifies users within the environment from captured audio, video, or image data of the environment, identifies one or more users included in the environment through any suitable method, and associates captured audio, video, or image data from a user with an identified user.

The communication system 300 determines a conversation between users is occurring in response to receiving a message from a user identifying one or more other users to receive the message. In response to determining a conversation between users is occurring, the communication system 300 generates a conversation identifier that uniquely identifies the conversation. The communication system 300 stores user identifiers of the users included in the conversation in association with the conversation identifier and stores messages between the users included in the conversation in association with the conversation identifier. Additional information, such as timestamps corresponding to times when the communication system 300 received messages from users in the conversation are also stored in various embodiments. As another example, the communication system 300 determines a conversation between users is occurring in response to determining at least a threshold number of users are in an environment including sensors coupled to the communication system 300 at a common time where the communication system 300 is authorized to capture data from the environment. As described above, the communication system 300 identifies users included in the environment and identifies messages from identified users in the environment from data captured by the sensors in the environment. The communication system 300 stores a conversation identifier for the determined conversation, stores user identifiers of identified user, and stores messages received from users included in the conversation in association with the conversation identifier.

In various embodiments, a conversation between users is a synchronous exchange of messages between a plurality of users. For example, a conversation is a meeting in an environment having sensors coupled to the communication system 300 where the communication system 300 captures messages between the users in the environment. In another embodiment, the conversation is an exchange of messages between users through a chat application, or other application transmitting messages between client devices, that routes messages through the communication system 300. As another example, a conversation is between users exchanging audio data captured by one or more microphones (e.g., a microphone on a headset or other client device, a microphone included in an environment) where the communication system 300 routes captured audio data to a client device or another output device for presentation to another user.

When the communication system 300 detects a conversation between a plurality of users, the communication system 300 receives 305 messages from users participating in the conversation and stores 310 the received messages in association with the conversation, as further described above. The communication system 300 stores 310 messages received from users participating in the conversation in association with a conversation identifier that uniquely identifies the conversation, and stores 310 a message in association with a user identifier that uniquely identifies the user from whom the message was received 305. This allows the communication system 300 to maintain a transcript of the conversation that can be subsequently retrieved by users, such as users participating in the conversation, to review information from the conversation.

As the conversation between users occurs, an additional user may join in the conversation, so the additional user joins the conversation after messages have been exchanged between the plurality of users already participating in the conversation. In various embodiments, the conversation. To determine when the additional user joins the conversation, the communication system obtains 320 characteristics of a client device 315 of the additional user and determines 325 whether the obtained characteristics satisfy one or more conditions. The one or more conditions may be stored in association with the conversation identifier, allowing the communication system 300 to maintain different conditions for users joining different conversations.

In some embodiments, a conversation identifier is associated with a type, with the type having one or more conditions for the additional user to join the conversation corresponding to the conversation identifier. For example, a type identifies a conversation as a lecture, as a meeting, as a text message exchange, as an audio call, or any other suitable type; hence, a type associated with a conversation describes one or more attributes of how messages are exchanged in the conversation. As another example, a type corresponds to an exchange of messages that users input to client devices, such as headsets, with the client devices transmitting and receiving the messages through the communication system 300. In the preceding example the type has one or more conditions for the additional user joining the conversation specifying the client device 315 of the additional user retrieves the conversation via an application, such as a chat application or a messaging application, executing on the client device 315. For example, the communication system 300 receives a request to retrieve a conversation from the client device 315 of the additional user and determines 325 whether the received request includes a conversation identifier matching the conversation identifier of the conversation. Responsive to determining 325 the conversation identifier included in the request matches the conversation identifier of the conversation, the communication system 300 determines the additional user is joining the conversation.

In another example, an alternative type of conversation corresponds to an exchange of messages between users included in an environment having sensors (e.g., microphones, image capture devices) coupled to the communication system 300. A conversation having the alternative type is also associated with a location of the environment in which the users are exchanging messages. The communication system 300 determines a location of the client device 315 of the additional user, such as from one or more position sensors included in the client device 315 and determines 325 whether the location of the client device 315 is within a threshold distance of the location associated with the conversation. In response to determining 325 the location of the client device 315 is within the threshold distance of the location, the communication system 300 determines 325 the additional user is joining the conversation.

When the additional user joins the conversation, the additional user is unaware of messages exchanged between users before the additional user joined the conversation. This can increase a time for the user to contribute to the conversation. Additionally, after joining the conversation, the additional user is unaware of contexts between users when the previous messages were exchanged. This context influences how users exchange messages that can affect how the additional user composes or provides messages, and without awareness of the context with which prior messages were exchanged during the conversation, the additional user may contribute messages to the conversation that can be incorrectly interpreted by the users previously exchanging messages in the conversation. Further, the additional user is unaware of the topics or content addressed by messages exchanged by users before the additional user joined the conversation, and it may be impractical for the additional user to obtain information from other users about the content and topics of the conversation from other users who have been participating in the conversation.

To allow the additional user to more easily and quickly contribute to the conversation while allowing the additional user to account for messages exchanged between users via the conversation before the additional user joined the conversation, the communication system 300 generates 330 a summary of the conversation that has occurred before the additional user joined the conversation. In various embodiments, the communication system 300 analyzes the previously received messages stored 310 in association with the conversation and extracts one or more topics or other keywords included in the previously received messages. The communication system 300 generates 330 the summary identifying the one or more topics to the additional user, the summary includes one or more messages corresponding to the one or more topics, such as saved messages having at least a threshold measure of similarity or at least a threshold measure of relevance to a topic. In various embodiments, to generate 330 the summary, the communication system 300 identifies messages received 305 in the conversation within a threshold amount of time from a time when the additional user joined the conversation. The communication system 300 generates 330 the summary based on the content of the identified messages, allowing the summary to describe content occurring within the threshold amount of time from the time when the additional user joined the conversation. In various embodiments, the communication system 300 stores different threshold amounts of time for different types of conversations. Additionally or alternatively, the communication system 300 stores one or more preferences for the additional user in a user profile, with one or more preferences identifying time intervals for generating 330 a summary of a conversation. For example, a preference maintained for the additional user identifies a threshold time interval from which messages are identified and used to generate 330 the summary for a type of conversation, while another preference maintained for the additional user identifies a different threshold time interval from which messages are identified and used to generate 330 the summary for a different type of conversation. For example, the additional user specifies a time interval of two hours for a conversation where text messages or chat messages are exchanged, while specifying a time interval of 10 minutes for a conversation where video or audio data is exchanged. In the preceding example, when the conversation has a type indicating exchange of text message or chat messages, the communication system 300 generates 330 the summary from text messages or chat messages received 305 within two hours of a time when the additional user joined the conversation; however, when the conversation has a type indicating exchange of audio or video content, the communication system 300 generates 330 the summary audio or video data received within 10 minutes of a time when the additional user joined the conversation. This allows the additional user to specify different time windows from a time when the additional user joined the conversation from which the communication system 300 generates 330 the summary for different types of conversations.

In some embodiments, the communication system 300 includes one or more models that are trained over time from interactions by the additional user when joining a conversation to determine which messages to identify for generating 330 the summary. For example, based on messages that the additional user accesses when joining conversations, the communication system 300 determines a time interval from which messages are retrieved and used to generate 330 the summary. As an additional example, the communication system 300 determines users from whom the additional user reviews messages when joining conversations and generates 330 the summary to include information from messages received from the determined users and contextual information about the determined users. The communication system 300 stores the one or more models in association with the additional user, allowing the communication system 300 to automatically identify messages in the conversation from which the summary for the user is generated 330.

The summary may be audio data, textual data, or a combination of audio data and textual data in various embodiments. The additional user identifies a type for the summary in various embodiments, allowing the additional user to specify a type of data included in the summary. For example, the communication system 300 maintains a format preference for the user indicating whether the summary for the user includes audio data, video data, or a combination thereof. The communication system 300 maintains different format preferences for the summary for different types of conversations in various embodiments, allowing the additional user to specify inclusion of different formats of data (e.g., text data, audio data) in summaries generated 330 for different types of conversations.

In various embodiments, the summary includes contextual information about users participating in the conversation in addition to summarizing topics included in messages of the conversation. For example, contextual information for a user identifies the user and one or more emotions of the user or reactions of the user to one or more messages that the communication system 300 determines from analysis of received data about the user. For example, when the conversation includes video data of users or audio data captured from users, the communication system 300 identifies a user corresponding to video data or to audio data and applies one or more models trained to determine emotion to the video data or audio data corresponding to the user. The communication system 300 stores the determined emotion in association with an identifier of the user and a time when the emotion was determined. When generating 330 the summary, the communication system 300 identifies emotions of one or more users or changes of emotions of the users. In some embodiments, the summary 330 identifies an emotion associated with at least a threshold percentage of users participating in the conversation, while in other embodiments, the summary 330 identifies users having emotions differing from an emotion determined for a majority of users participating in the conversation as well as one or more emotions determined for the identified users. Including information about emotions of users in the summary allows the summary to augment summarization of topics discussed during the conversation with information about reactions and mindsets of users participating in the conversation when the additional user joins the conversation, allowing the additional user to better account for mental states of users participating in the conversation when creating messages for distribution to the users participating in the conversation.

Figure 4:
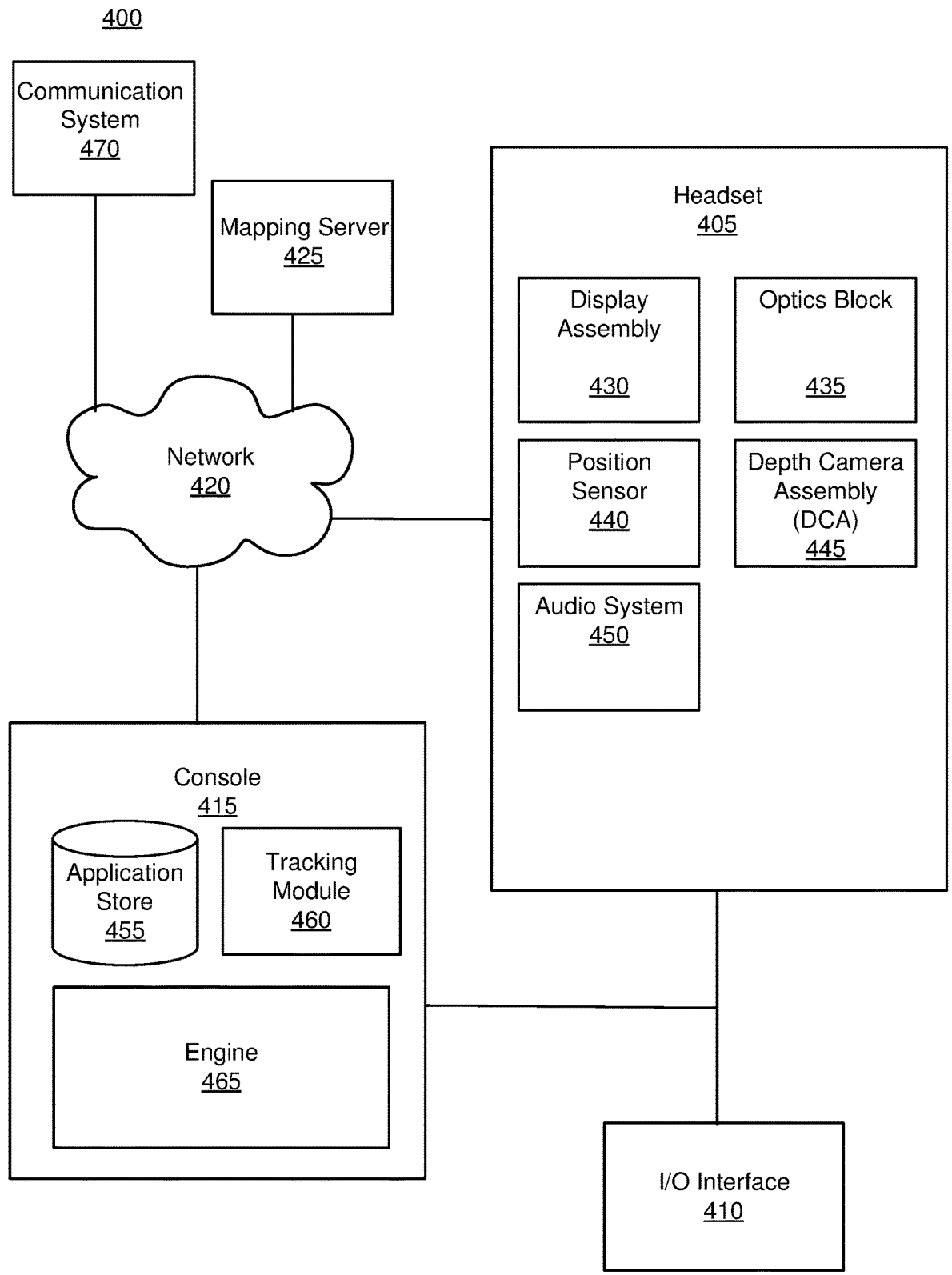
FIG. 4 is a system that includes a headset, in accordance with one or more embodiments.

The communication system 300 transmits 335 the summary of the conversation to the client device 315 of the additional user, which presents 340 the summary to the additional user. Presentation of the summary to the additional user depends on a format of the summary. For example, a summary including textual data is displayed to the user via a display device of the client device 315. As an example, the client device 315 is a headset 100 as further described above in conjunction with FIG. 1A, with the summary displayed to the additional user via the display element 120 of the headset 100. Alternatively, a summary including audio data is played to the user via one or more speakers of the client device 315. In an embodiment where the client device 315 is the headset 100 further described above in conjunction with FIG. 1A, the audio data comprising the summary is played to the user via one or more speakers 160 of the headset 100. When the summary includes audio data, the client device 315 may play the audio data at a different speed than audio currently received for the conversation, allowing the additional user to differentiate between the audio data comprising the summary and the audio data from messages received by the communication system 300 for the conversation after the additional user has joined the conversation. In other embodiments, the client device 315 plays audio data comprising the summary at a different volume (e.g., a higher volume) than audio data received 305 for the conversation after the additional user has joined the conversation or otherwise audibly distinguishes audio data comprising the summary from audio data from messages received 305 after the additional user has joined the conversation. For example, audio data comprising the summary is played at a faster rate and at a higher volume than audio received 305 by the communication system 300 after the additional user has joined the conversation until the summary has been fully played for the additional user FIG. 4 is a system 400 that includes a headset 405, in accordance with one or more embodiments. In some embodiments, the headset 405 may be the headset 100 of FIG. 1A or the headset 105 of FIG. 1B. The system 400 may operate in an artificial reality environment (e.g., a virtual reality environment, an augmented reality environment, a mixed reality environment, or some combination thereof). The system 400 shown by FIG. 4 includes the headset 405, an input/output (I/O) interface 410 that is coupled to a console 415, the network 420, and the mapping server 425. While FIG. 4 shows an example system 400 including one headset 405 and one I/O interface 410, in other embodiments any number of these components may be included in the system 400. For example, there may be multiple headsets each having an associated I/O interface 410, with each headset and I/O interface 410 communicating with the console 415. In alternative configurations, different and/or additional components may be included in the system 400. Additionally, functionality described in conjunction with one or more of the components shown in FIG. 4 may be distributed among the components in a different manner than described in conjunction with FIG. 4 in some embodiments. For example, some or all of the functionality of the console 415 may be provided by the headset 405.

The headset 405 includes the display assembly 430, an optics block 435, one or more position sensors 440, and the DCA 445. Some embodiments of headset 405 have different components than those described in conjunction with FIG. 4. Additionally, the functionality provided by various components described in conjunction with FIG. 4 may be differently distributed among the components of the headset 405 in other embodiments, or be captured in separate assemblies remote from the headset 405.

The display assembly 430 displays content to the user in accordance with data received from the console 415. The display assembly 430 displays the content using one or more display elements (e.g., the display elements 120). A display element may be, e.g., an electronic display. In various embodiments, the display assembly 430 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 435.

The optics block 435 may magnify image light received from the electronic display, corrects optical errors associated with the image light, and presents the corrected image light to one or both eyeboxes of the headset 405. In various embodiments, the optics block 435 includes one or more optical elements. Example optical elements included in the optics block 435 include: an aperture, a Fresnel lens, a convex lens, a concave lens, a filter, a reflecting surface, or any other suitable optical element that affects image light. Moreover, the optics block 435 may include combinations of different optical elements. In some embodiments, one or more of the optical elements in the optics block 435 may have one or more coatings, such as partially reflective or anti-reflective coatings.

Magnification and focusing of the image light by the optics block 435 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 435 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 435 corrects the distortion when it receives image light from the electronic display generated based on the content.

The position sensor 440 is an electronic device that generates data indicating a position of the headset 405. The position sensor 440 generates one or more measurement signals in response to motion of the headset 405. The position sensor 190 is an embodiment of the position sensor 440. Examples of a position sensor 440 include: one or more IMUS, one or more accelerometers, one or more gyroscopes, one or more magnetometers, another suitable type of sensor that detects motion, or some combination thereof. The position sensor 440 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 405 from the sampled data. For example, the IMU integrates the measurement signals received from the accelerometers over time to estimate a velocity vector and integrates the velocity vector over time to determine an estimated position of a reference point on the headset 405. The reference point is a point that may be used to describe the position of the headset 405. While the reference point may generally be defined as a point in space, however, in practice the reference point is defined as a point within the headset 405.

The DCA 445 generates depth information for a portion of the local area. The DCA includes one or more imaging devices and a DCA controller. The DCA 445 may also include an illuminator. Operation and structure of the DCA 445 is described above with regard to FIG. 1A.

The audio system 450 provides audio content to a user of the headset 405. The audio system 450 is substantially the same as the audio system 200 described above. The audio system 450 may comprise one or acoustic sensors, one or more transducers, and an audio controller. The audio system 450 may provide spatialized audio content to the user. In some embodiments, the audio system 450 may request acoustic parameters from the mapping server 425 over the network 420. The acoustic parameters describe one or more acoustic properties (e.g., room impulse response, a reverberation time, a reverberation level, etc.) of the local area. The audio system 450 may provide information describing at least a portion of the local area from e.g., the DCA 445 and/or location information for the headset 405 from the position sensor 440. The audio system 450 may generate one or more sound filters using one or more of the acoustic parameters received from the mapping server 425, and use the sound filters to provide audio content to the user.

The I/O interface 410 is a device that allows a user to send action requests and receive responses from the console 415. An action request is a request to perform a particular action. For example, an action request may be an instruction to start or end capture of image or video data, or an instruction to perform a particular action within an application. The I/O interface 410 may include one or more input devices. Example input devices include: a keyboard, a mouse, a game controller, or any other suitable device for receiving action requests and communicating the action requests to the console 415. An action request received by the I/O interface 410 is communicated to the console 415, which performs an action corresponding to the action request. In some embodiments, the I/O interface 410 includes an IMU that captures calibration data indicating an estimated position of the I/O interface 410 relative to an initial position of the I/O interface 410. In some embodiments, the I/O interface 410 may provide haptic feedback to the user in accordance with instructions received from the console 415. For example, haptic feedback is provided when an action request is received, or the console 415 communicates instructions to the I/O interface 410 causing the I/O interface 410 to generate haptic feedback when the console 415 performs an action.

The console 415 provides content to the headset 405 for processing in accordance with information received from one or more of: the DCA 445, the headset 405, and the I/O interface 410. In the example shown in FIG. 4, the console 415 includes an application store 455, a tracking module 460, and an engine 465. Some embodiments of the console 415 have different modules or components than those described in conjunction with FIG. 4. Similarly, the functions further described below may be distributed among components of the console 415 in a different manner than described in conjunction with FIG. 4. In some embodiments, the functionality discussed herein with respect to the console 415 may be implemented in the headset 405, or a remote system.

The application store 455 stores one or more applications for execution by the console 415. An application is a group of instructions, that when executed by a processor, generates content for presentation to the user. Content generated by an application may be in response to inputs received from the user via movement of the headset 405 or the I/O interface 410. Examples of applications include: gaming applications, conferencing applications, video playback applications, or other suitable applications.

The tracking module 460 tracks movements of the headset 405 or of the I/O interface 410 using information from the DCA 445, the one or more position sensors 440, or some combination thereof. For example, the tracking module 460 determines a position of a reference point of the headset 405 in a mapping of a local area based on information from the headset 405. The tracking module 460 may also determine positions of an object or virtual object. Additionally, in some embodiments, the tracking module 460 may use portions of data indicating a position of the headset 405 from the position sensor 440 as well as representations of the local area from the DCA 445 to predict a future location of the headset 405. The tracking module 460 provides the estimated or predicted future position of the headset 405 or the I/O interface 410 to the engine 465.

The engine 465 executes applications and receives position information, acceleration information, velocity information, predicted future positions, or some combination thereof, of the headset 405 from the tracking module 460. Based on the received information, the engine 465 determines content to provide to the headset 405 for presentation to the user. For example, if the received information indicates that the user has looked to the left, the engine 465 generates content for the headset 405 that mirrors the user's movement in a virtual local area or in a local area augmenting the local area with additional content. Additionally, the engine 465 performs an action within an application executing on the console 415 in response to an action request received from the I/O interface 410 and provides feedback to the user that the action was performed. The provided feedback may be visual or audible feedback via the headset 405 or haptic feedback via the I/O interface 410.

The network 420 couples the headset 405 and/or the console 415 to the mapping server 425. The network 420 may include any combination of local area and/or wide area networks using both wireless and/or wired communication systems. For example, the network 420 may include the Internet, as well as mobile telephone networks. In one embodiment, the network 420 uses standard communications technologies and/or protocols. Hence, the network 420 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 420 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 420 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 425 may include a database that stores a virtual model describing a plurality of spaces, wherein one location in the virtual model corresponds to a current configuration of a local area of the headset 405. The mapping server 425 receives, from the headset 405 via the network 420, information describing at least a portion of the local area and/or location information for the local area. The user may adjust privacy settings to allow or prevent the headset 405 from transmitting information to the mapping server 425. The mapping server 425 determines, based on the received information and/or location information, a location in the virtual model that is associated with the local area of the headset 405. The mapping server 425 determines (e.g., retrieves) one or more acoustic parameters associated with the local area, based in part on the determined location in the virtual model and any acoustic parameters associated with the determined location. The mapping server 425 may transmit the location of the local area and any values of acoustic parameters associated with the local area to the headset 405.

One or more components of system 400 may contain a privacy module that stores one or more privacy settings for user data elements. The user data elements describe the user or the headset 405. For example, the user data elements may describe a physical characteristic of the user, an action performed by the user, a location of the user of the headset 405, a location of the headset 405, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 400 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

In various embodiments, the system 400 includes a communication system 470 coupled to the headset 405 via the network 420. The communication system 470 receives messages including one or more of text data, video data, and audio data from the headset 405 and transmits a message to another headset 405, allowing users to exchange messages generated or obtained from one or more headsets 405 in a conversation. The communication system 470 stores messages exchanged between users subject to the users exchanging messages authorizing the communication system 470 to store the messages. Additionally, the communication system 470 includes one or more modules or processes configured to generate a summary of messages included in a conversation based on content of the messages included in the conversation. The communication system 470 also includes one or more processes or modules that identify an emotion of a user from messages received from the user or of data including the user, such as audio data from the user or video data including the user. The summary identifies an emotion of one or more users in various embodiments. As further described above in conjunction with FIG. 3, the communication system 470 transmits the summary to a headset 405 of a user in response to determining the user is joining an existing conversation between users. As further described above in conjunction with FIG. 3, the communication system 470 determines the user is joining the existing conversation in response to characteristics of the headset 405 of the user satisfying one or more criteria (e.g., receiving a request identifying the conversation from the headset 405, determining the headset 405 is within a threshold distance of a location of the conversation), etc. The summary allows the user joining the existing conversation to more quickly identify topics or subjects that have been addressed by messages between users already in the conversation, as well as to obtain contextual information about users who are already participating in the conversation.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
capturing a conversation between a plurality of users at a communication system, the conversation including one or more messages exchanged between the plurality of users that are located within a same room;
determining, from one or more position sensors included in a client device of an additional user other than any of the plurality of users, that a location of the client device is within a threshold distance of a location associated with the conversation, wherein the location of the client device and the location associated with the conversation are within the same room;
determining, by the communication system based at least in part on the location of the client device being within the threshold distance of the location associated with the conversation, that characteristics of the client device satisfy one or more conditions for joining the conversation;
when the communication system determines that the characteristics of the client device satisfy the one or more conditions for joining the conversation, generating, by the communication system, a summary of the conversation for the additional user based on messages included in the conversation occurring before the determining that the characteristics of the client device satisfy the one or more conditions for joining the conversation, wherein generating the summary includes (a) identifying, by the communication system, for respective ones of the plurality of users participating in the conversation, a respective emotion associated with a respective user, wherein each of the respective emotions is determined based on data captured from the respective users during the conversation at a time when the respective emotion is determined, and (b) identifying, by the communication system, one of the respective emotions as a shared emotion associated with at least a threshold percentage of the respective users, and including, in the summary, an identification of the shared emotion as being associated with at least the threshold percentage of the respective users; and transmitting the summary from the communication system to the client device for presentation to the additional user via the client device.

2. The method of claim 1, wherein generating the summary comprises:

identifying messages included in the conversation within a threshold amount of time from a time when the characteristics of the client device were determined to satisfy the one or more conditions for joining the conversation; and generating the summary from content included in the identified messages.

3. The method of claim 2, wherein the threshold amount of time is included in a preference maintained by the communication system for the additional user.

4. The method of claim 2, wherein the threshold amount of time is determined based on a type of the conversation.

5. The method of claim 1, wherein the determining that the characteristics of the client device satisfy one or more conditions for joining the conversation further comprises:

determining that a conversation identifier included in a request received by the communication system from the client device matches a conversation identifier of the conversation.

6. The method of claim 1, wherein the summary comprises text data configured to be displayed by a display element of the client device.

7. The method of claim 1, wherein the summary comprises audio data configured to be played by one or more speakers of the client device.

8. The method of claim 7, wherein the audio data comprising the summary is configured to be played by the client device at a faster speed than audio data included in messages of the conversation captured after the determining that the characteristics of the client device satisfy one or more conditions for joining the conversation.

9. The method of claim 7, wherein the audio data comprising the summary is configured to be played by the client device at a higher volume than audio data included in messages of the conversation captured after the determining that the characteristics of the client device satisfy one or more conditions for joining the conversation.

10. The method of claim 1, wherein generating, by the communication system, the summary comprises:

identifying video data or audio data in the captured data and corresponding to the one user; and applying one or more models trained to determine emotion to the identified video data or audio data to determine the respective emotion of a respective user.

11. The method of claim 1, wherein the summary includes (1) identifiers of ones of the respective users having a respective emotions different from the shared emotion and (2) the respective different emotions of the identified respective users.

12. The method of claim 1, wherein generating, by the communication system, the summary includes the communication system storing (1) a respective identifier of each of the plurality of users for which a respective emotion is determined, (2) the respective determined emotion in association with the respective identifier, and (3) a respective time at which the respective emotion was determined.

13. A computer program product comprising a non-transitory computer-readable storage medium having instructions encoded thereon that, when executed by a processor, causes the processor to:

capture a conversation between a plurality of users at a communication system, the conversation including one or more messages exchanged between the plurality of users that are located within a same room;

determine, from one or more position sensors included in a client device of an additional user other than any of the plurality of users, that a location of the client device is within a threshold distance of a location associated with the conversation, wherein the location of the client device and the location associated with the conversation are within the same room;

determine, by the communication system based at least in part on the location of the client device being within the threshold distance of the location associated with the conversation, that characteristics of the client device satisfy one or more conditions for joining the conversation;

when the communication system determines that the characteristics of the client device satisfy the one or more conditions for joining the conversation, generate, by the communication system, a summary of the conversation for the additional user based on messages included in the conversation occurring before the determining that the characteristics of the client device satisfy the one or more conditions for joining the conversation, wherein generating the summary includes (a) identifying, by the communication system, for respective ones of the plurality of users participating in the conversation, a respective emotion associated with a respective user, wherein each of the respective emotions is determined based on data captured from the respective users during the conversation at a time when the respective emotion is determined, and (b) identifying, by the communication system, one of the respective emotions as a shared emotion associated with at least a threshold percentage of the respective users, and including, in the summary, an identification of the shared emotion as being associated with at least the threshold percentage of the respective users; and transmitting the summary from the communication system to the client device for presentation to the additional user via the client device.

14. The computer program product of claim 13, wherein an operation by the communication system to generate the summary comprises:

identifying messages included in the conversation within a threshold amount of time from a time when the characteristics of the client device were determined to satisfy the one or more conditions for joining the conversation; and generating the summary from content included in the identified messages.

15. The computer program product of claim 14, wherein the threshold amount of time is included in a preference maintained by the communication system for the additional user.

16. The computer program product of claim 14, wherein the threshold amount of time is determined based on a type of the conversation.

17. The computer program product of claim 14, wherein an operation by the communication system to determine that the characteristics of the client device satisfy one or more conditions for joining the conversation further comprises:
  determining that a conversation identifier included in a request received by the communication system from the client device matches a conversation identifier of the conversation.

18. The computer program product of claim 13, wherein the summary comprises text data configured to be displayed by a display element of the client device.

19. The computer program product of claim 13, wherein the summary comprises audio data configured to be played by one or more speakers of the client device.

20. The computer program product of claim 19, wherein the audio data comprising the summary is configured to be played by the client device at a faster speed than audio data included in messages of the conversation captured after the determining that the characteristics of the client device satisfies one or more conditions for joining the conversation.

21. The computer program product of claim 19, wherein the audio data comprising the summary is configured to be played by the client device at a higher volume than audio data included in messages of the conversation captured after the determining that the characteristics of the client device satisfies one or more conditions for joining the conversation.

22. The computer program product of claim 13, wherein an operation to generate, by the communication system, the summary comprises:
  identifying video data or audio data in the captured data and corresponding to the one user; and
  applying one or more models trained to determine emotion to the identified video data or audio data to determine the respective emotion of a respective user.

23. The computer program product of claim 1, wherein the summary includes (1) identifiers of ones of the respective users having respective emotions different from the shared emotion and (2) the respective different emotions of the identified respective users.

24. The computer program product of claim 13, wherein generating, by the communication system, the summary includes the communication system storing (1) a respective identifier of each of the plurality of users for which a respective emotion is determined, (2) the respective determined emotion in association with the respective identifier, and (3) a respective time at which the respective emotion was determined.

25. The method of claim 1, wherein the threshold percentage is a majority of the respective users.

26. A computing system comprising:
  one or more processors; and
  one or more memories storing instructions that, when executed by the one or more processors, cause the computing system to perform a process comprising:
    capturing a conversation between a plurality of users at a communication system, the conversation including one or more messages exchanged between the plurality of users that are located within a same room;
    determining, from one or more position sensors included in a client device of an additional user other than any of the plurality of users, that a location of the client device is within a threshold distance of a location associated with the conversation, wherein the location of the client device and the location associated with the conversation are within the same room;
    determining, by the communication system based at least in part on the location of the client device being within the threshold distance of the location associated with the conversation, that characteristics of the client device satisfy one or more conditions for joining the conversation;
    generating, by the communication system, a summary of the conversation for the additional user based on messages included in the conversation occurring before the determining that the characteristics of the client device satisfy the one or more conditions for joining the conversation, wherein generating the summary includes (a) identifying, by the communication system, for respective ones of the plurality of users participating in the conversation, a respective emotion associated with a respective user, wherein each of the respective emotions is determined based on data captured from the respective users during the conversation at a time when the respective emotion is determined, and (b) identifying, by the communication system, one of the respective emotions as a shared emotion associated with at least a threshold percentage of the respective users, and including, in the summary, an identification of the shared emotion as being associated with at least the threshold percentage of the respective users; and
    transmitting the summary from the communication system to the client device for presentation to the additional user via the client device.

* * * * *